United States Patent
Skolnick et al.

3,697,151
Oct. 10, 1972

[54] CRYOGENICALLY COOLED FARADAY ROTATOR ELEMENT

[72] Inventors: Michael L. Skolnick, Monroe; Carl J. Buczek, Manchester, both of Conn.

[73] Assignee: United Aircraft Corporation, East Hartford, Conn.

[22] Filed: Aug. 14, 1970

[21] Appl. No.: 63,737

[52] U.S. Cl. ................................... 350/151, 62/514
[51] Int. Cl. .............................................. G02f 1/22
[58] Field of Search ........................ 350/151; 62/514

[56] References Cited

UNITED STATES PATENTS

| | | | |
|---|---|---|---|
| 3,420,601 | 1/1969 | Young et al. | 350/151 |
| 3,051,781 | 8/1962 | Ward | 350/151 |
| 1,834,044 | 12/1931 | Bloomenthal et al. | 350/150 |

*Primary Examiner*—Ronald L. Wibert
*Assistant Examiner*—Jeff Rothenberg
*Attorney*—Melvin Pearson Williams

[57] ABSTRACT

A semiconductive optical window of the type exhibiting a Faraday rotation in the presence of a magnetic field is cryogenically cooled in a dewar having flexure mounts for the element. The flexure mounts comprise metallic supports having a suitable aspect ratio (length to thickness) to guarantee adequate flexure, the supports being bonded to the element. The flexure mounts are disposed on opposite faces of the element and circumscribe a clear optical path through the element near the periphery of the element; this provides a fluid seal between the clear optical path through the element and the extreme periphery of the element, whereby the extreme periphery is immersed in cryogenic fluid. The element is disposed in an evacuated chamber for insulating purposes.

2 Claims, 1 Drawing Figure

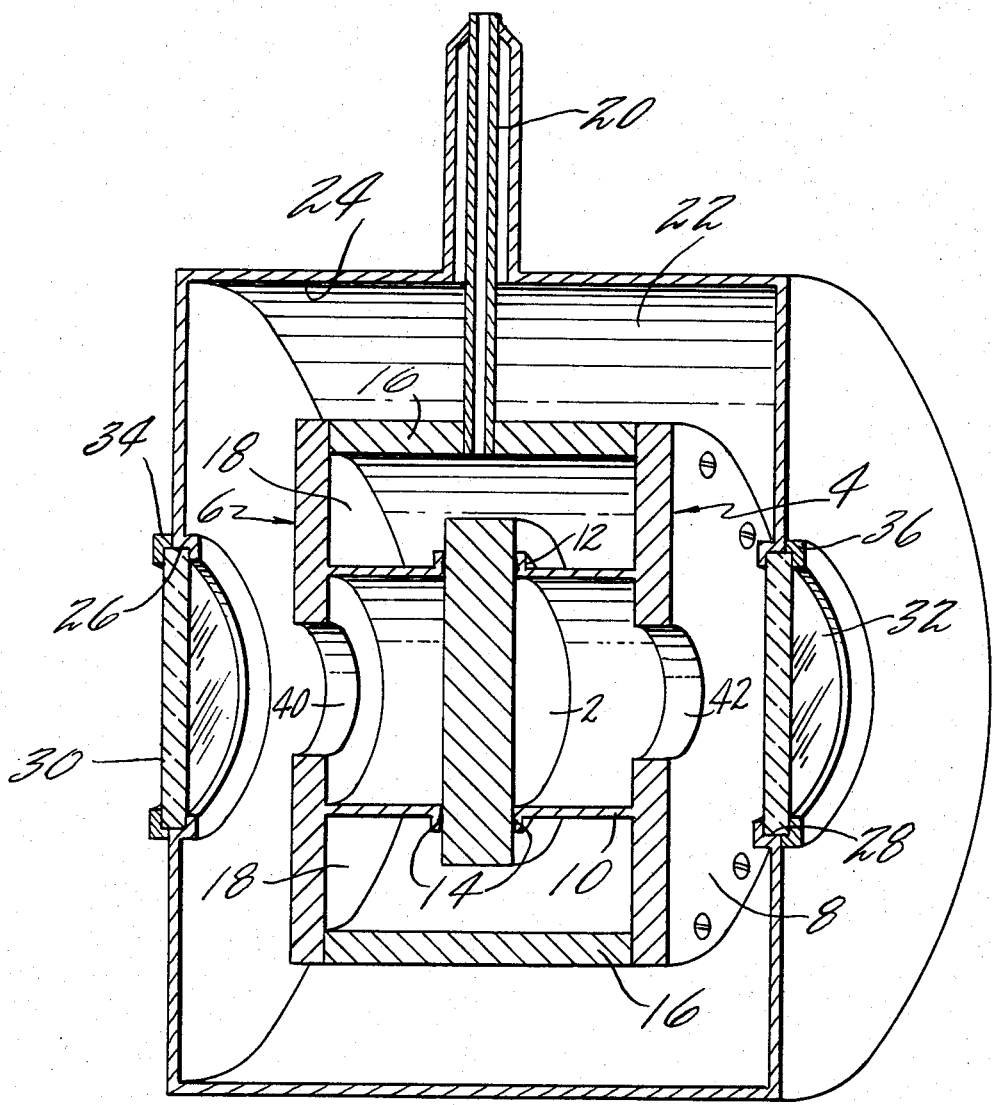

CRYOGENICALLY COOLED FARADAY ROTATOR ELEMENT

BACKGROUND OF THE INVENTION

1. Field of the Invention

This invention relates to Faraday rotators, and more particularly to a cryogenically cooled Faraday rotator element.

The invention herein described was made in the course of or under a contract or sub-contract thereunder with the Department of the Air Force.

2. Description of the Prior Art

In the optical arts, a well-known device is a Faraday rotator which comprises a material having the characteristic that, when placed in an axial magnetic field, it exhibits a different index of refraction for circularly polarized light having a direction of propogation aligned parallel with the magnetic field than for circularly polarized light having a direction of propogation antiparallel to the magnetic field. Such devices are most commonly used in optical isolators and circulators for separating the various stages of master oscillator-power amplifier systems; separating the transmission and reception channels in systems (such as radar and line scanners) using common optical components; and for isolating stable lasers from feedback and backscattered radiation which causes frequency instability in laser oscillators. An exemplary form of an isolator using a Faraday rotor is disclosed and claimed in a prior copending application of Michael L. Skolnick, Ser. No. 875,238 now U.S. Pat. No. 3,617,129, filed on Nov. 10, 1969 and entitled "Interferometric Optical Isolator." The system disclosed therein, as is common in such optical systems, utilizes a Faraday rotator to introduce a directional anisotropy to circularly polarize radiation.

One of the drawbacks of using a Faraday rotator as described hereinbefore is the power limitation which it imposes on a system. If high power is required, the absorption of energy by the material of the Faraday rotator can easily result in thermal damage. As an example, Faraday rotators used in the infrared, and particularly, the 10.6 micron radiation which results from a carbon dioxide laser, has been limited to less than 10 watts, and usually less than 5 watts. At this wavelength, a common material for the Faraday rotator is single crystal indium antimonide. Of course, thermal damage can be reduced if the absorption characteristic of the material can be reduced, and can also be reduced if thermal conductivity of the material to a suitably cooled heat sink can be increased. It is known in the art that the absorption goes down as the temperature of the material goes down, and there can be a great increase in the conductivity of the material at a suitably low temperature. However, such materials cannot simply be immersed in a cryogenic fluid to achieve a suitable temperature since the cryogenic fluid generally will have a high absorption characteristic at the wavelengths involved. On the other hand, complex and intricate mounting systems known to the prior art have failed due to fracture of the material in all cases.

SUMMARY OF THE INVENTION

The object of the present invention is to provide a cryogenically cooled Faraday rotator element.

According to the present invention, an optical element having characteristics suitable for use in a Faraday rotator has bonded to each of the radiation-receiving surfaces thereof flexible seals having a high aspect ratio; the seals are disposed near the outer extremities of the radiation-receiving surfaces, thereby enclosing a free radiation path, and providing a portion of the element on the side of the seals external of the free radiation path thereby to permit direct immersion of said portion of the element in a cryogenic fluid which is isolated from the radiation path through the material by the seals. In accordance further with the present invention, the optical element is directly immersed in cryogenic fluid while at the same time a radiation path is provided through the element without the need for the radiation to pass through the cryogenic fluid. In still further accord with the present invention, the combined fluid seal and mounting structure is comprised of flexible material having a high aspect ratio, whereby cycling of the temperature of the optical element between cryogenic temperatures and room temperatures does not result in fracture of the material, the mount for the material, or bonds therebetween.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a simplified, partially sectioned perspective view of a cryogenically cooled Faraday rotator element in accordance with the present invention.

DESCRIPTION OF THE PREFERRED EMBODIMENT

Referring to the figure, an optical element 2 is illustrated, in the embodiment of the invention herein, as comprising a disc of indium antimonide disposed between a pair of combined flexure mounts and seals 4, 6. Each of the mounts 4, 6 is a compound structure comprising a main, essentially disc-like portion 8 having a cylindrical portion 10 extending therefrom, with a flange 12 on the cylindrical portion 10. The flange 12 provides a suitable surface to effect an epoxy bond and seal 14 between the flange 12 and the optical element 2. The flange 12 and cylinder 10 comprise a flexible annular wall.

The mounts 4 and 6 may be formed from single pieces of a suitable metal, such as aluminum, by suitable turning from a single piece of starting material on a lathe. On the other hand, the disc 8, cylinder 10 and flange 12 may be made independently and suitably metallurgically bonded together if desired. However, in order to get a high aspect ratio to the cylindrical portion 10, the simplest procedure is to cut the mounts 4 and 6 on a lathe, carefully controlling the thickness of the material so that the cylinder 10 is quite flexible. Exemplary dimensions of the mounts 4 and 6 include an overall diameter of about two inches, the cylinder 10 having a diameter of about an inch, with a wall thickness of about 0.010 inch and a length on the order of one quarter of an inch. The flange 12 may have a thickness (right to left in the figure) on the order of 0.010 inch and the radial thickness on the order of one-sixteenth of an inch. have, to work with mounts 4, 6 as just described, a diameter on the order of one and one quarter of an inch, and may have a thickness on the order of one quarter of an inch. The mounts 4, 6 are suitably fastened to a hollow block 16 which is preferably composed of the same type of non-magnetic metal as the mounts 4, 6. The block 16, mounts 4 and 6, including the disc portions 8 and the cylinders 10 together form an annular chamber 18 which is in fluid communication with a filler tube 20 into which a cryogenic fluid may be introduced. For instance, liquid nitrogen may be poured into the filler tube 20 until the chamber 18 is completely filled therewith.

All of the apparatus 2-20 described thus far is contained within an evacuated chamber 22 suitably formed of a wall structure 24, which has a pair of holes 26, 28 therein adjacent to which there are disposed corresponding windows 30, 32 which may be secured to the wall structure 24 by suitable well known means such as flanges 34, 36 sealed with resilient annular rings. The windows may be mounted in any one of a number of alternative methods well known in the art. The windows 30, 32 are coaxially aligned with the optical element 2, and each of the mounts 4, 6 is provided with hole 40, 42 for optical as well as fluid communication between the chamber 22 and the optical element 2. Thus, the apparatus is comprised in a cryogenic dewar. The optical element 2 and the windows 30, 32 may have suitable anti-reflection coatings, as is known in the art.

As is known, all of the very cold cryogenic fluids such as nitrogen and helium have a very high vaporization pressure, and, therefore, cannot be contained in less than most cumber-some, superstrong containers. In use, these gases are allowed to boil, thereby obviating the need to maintain the containers at high pressure. It is, therefore, necessary to fill the chamber 18 whenever a Faraday rotator element according to the present invention is to be used. In filling the chamber, however, were it not for the principles of the present invention, the optical element 2 would be fractured as the result of the difference in thermal expansion between the optical element 2 and its mounting structure (10, 12). According to the present invention, this is prevented due to the flexibility of the cylindrical portion 10 of the mounts 4, 6. It is to be noted that the seal between the optical element 2 and the mounts 4, 6 does not supply the flexibility, but rather acts as a cementing agent and a fluid seal between the chamber 18 and the chamber 22. The dimensions of the structure incorporating the present invention must, however, be closely controlled. For instance, the width of the block 16 (from right to left as seen in the Figure) between the mounts 4, 6 must be closely controlled so as to be no larger than the total length of the cylindrical portions 10, the flanges 12, the nominal thickness of the epoxy and the thickness of the optical element 2. If the width is insufficient, then when the parts are securely brought together, the optical element 2 and/or the cylindrical portions 10 will be damaged. If the block is too wide, then there may be too great an amount of epoxy required to join the optical element 2 to the mounts 4, 6.

Because the periphery of the optical element 2 is immersed in the cryogen, it is held at very nearly the temperature of the cryogenic fluid. This causes a very large increase in the thermal conductivity of the element to minimize the temperature rise thereof (as a result of radiation passing therethrough being absorbed therein) by the efficient transfer of the heat to the cryogen. Additionally, the temperature rise is further minimized since, at the temperature of the cryogen, the optical element 2 has a substantially reduced free carrier optical absorption; thus, the optical element not only absorbs less energy, but it can readily conduct any heat resulting therefrom directly to the cryogen.

Note that crystals and other materials suitable for use as optical elements in the context of the present invention quite frequently do not have exact dimensions, and, therefore, another feature of the present invention is that the structure disclosed permits noncylindrical disc-type structures to be suitably mounted without any necessity for exact dimensions, other than that the faces be planar.

Another feature of the present invention is that the seal between the mounts 4, 6 and the element 2 permits a free optical path from the windows 30, 32 through the optical element 2 while at the same time permitting the optical element 2 to be continuously cooled directly in the cryogenic fluid.

Although disclosed herein as being circular in cross section, it should be understood that square cross sections or other cross sections could be used as desired; thus, as used herein, "annular" is construed to include other than toroid-type cavities; the only significance is that there be provided a chamber which closes on itself, leaving a free open space in the center thereof for the passage of light therethrough, the inner walls of the chamber being closed by the optical element.

If the entire dewar is to be immersed in a magnetic field, then only non-magnetic materials, such as aluminum and epoxy, should be used.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An optical element apparatus which can be cooled with cryogenic fluid comprising:

a generally disc-like Faraday rotator element having an optical and axis a pair of parallel planar surfaces perpendicular to said axis;

an annular hollow structure which forms a completely enclosed annular chamber coaxial with said optical element and surrounding a substantial portion of said optical element which is centrally disposed therein with the outer periphery of said planar surfaces extending into said chamber;

means for introducing a cryogenic fluid into said chamber; and an outer chamber wall coaxial with said optical element and completely surrounding said annular hollow structure and having windows disposed therein substantially coaxially aligned with the center of said planar surfaces.

2. An optical element apparatus according to claim 1 wherein said annular hollow structure comprises:

a pair of identical parallel discs having centrally disposed apertures axially aligned therethrough, each of said discs having a thin, flexible, cylindrical wall member extending from a flat surface thereof, the wall member of the respective discs disposed to face each other, each of said wall members having a flange thereon, each of said flanges being joined with a bonding agent to a respective one of said planar surfaces; and a substantially annular block structure having an outer diameter at which it is sealably attached to said discs, the dimension between the discs being substantially equal to the total length of both of said wall members, both of said flanges, said optical element and the thickness of bonding agent joining said flanges to said optical element.

* * * * *

PO-1050
(5/69)

UNITED STATES PATENT OFFICE
CERTIFICATE OF CORRECTION

Patent No. 3,697,151      Dated October 10, 1972

Inventor(s) Michael L. Skolnick, et al.

It is certified that error appears in the above-identified patent and that said Letters Patent are hereby corrected as shown below:

Claim 1, column 4, line 51 - delete "and axis" and insert

--axis and--

Signed and sealed this 13th day of February 1973.

(SEAL)
Attest:

EDWARD M.FLETCHER,JR.
Attesting Officer

ROBERT GOTTSCHALK
Commissioner of Patents